March 4, 1969     S. AVIANDER     3,431,471
STATIC TIME DELAY RELAY
Filed Nov. 4, 1966
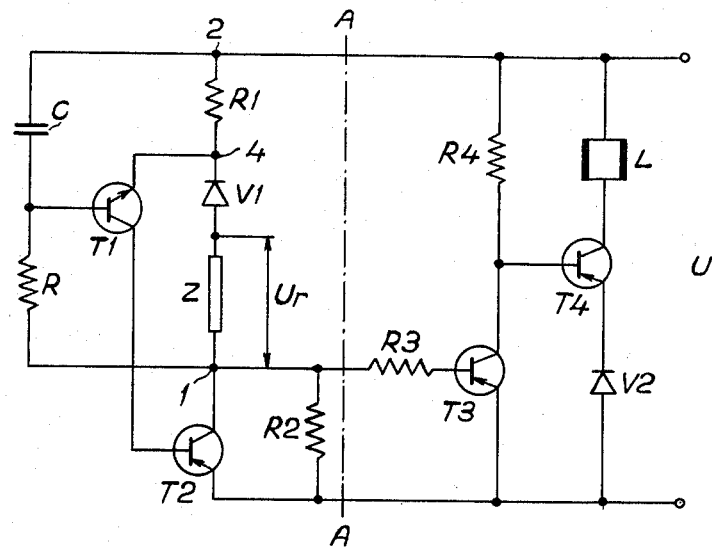
Fig. 1
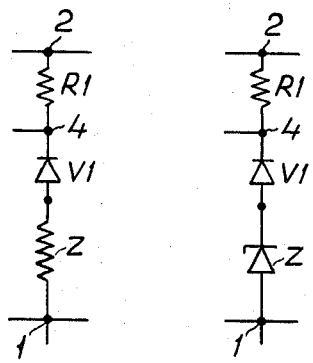
Fig. 2    Fig. 3    Fig. 4
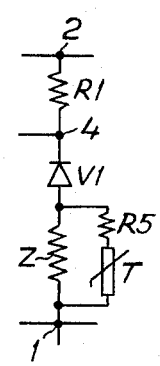

United States Patent Office 3,431,471
Patented Mar. 4, 1969

3,431,471
STATIC TIME DELAY RELAY
Stig Aviander, Vasteras, Sweden, assignor to Allmänna Svenska Elektriska Aktiebolaget, Vasteras, Sweden, a Swedish corporation
Filed Nov. 4, 1966, Ser. No. 592,060
Claims priority, application Sweden, Nov. 5, 1965, 14,289/65
U.S. Cl. 317—142          5 Claims
Int. Cl. H01h 47/18

ABSTRACT OF THE DISCLOSURE

A static time delay relay having a time circuit and a level sensing circuit in which the delay is determined by the charging time of a capacitor in an RC-circuit. The time circuit consists of the RC-circuit and a voltage divider. The RC-circuit is connected in parallel with part of the voltage divider. The level sensing circuit is an elementary amplifier with two transistors, the base of the first transistor being connected to the voltage divider, and a relay coil induced in the emitter-collector circuit of the second transistor.

---

In static time relays the delay is usually effected by charging a capacitor in an RC-circuit and the voltage across the capacitor determines the tripping moment. During charging the RC-circuit is connected to a voltage source having constant voltage and thus it follows that the capcaitor voltage increases according to an e-function, that is, it increases rapidly in the beginning, but gradually increases more slowly towards the end of the charging time. This means that the derivative of the capacitor voltage is low at the end of the charging process, which causes uncertainty and great variation in the determination of the tripping moment of the relay, and also means that disturbances of various types have greater influence.

Summary of the invention

The present invention relates to a time relay in which the delay is determined by the charging time for a capacitor in an RC-circuit, but in which the above mentioned disadvantages are avoided. The invention is characterised in that a first control device, influenced by the capacitor voltage, is arranged to maintain the charging voltage of the RC-circuit at a value somewhat higher than the capacitor voltage.

In a time relay according to the invention, therefore, the charging voltage varies and is so controlled that, at least during the greater part of the charging process, it is slightly, but definitely above the capacitor voltage. In contrast to ordinary charging from constant voltage, charging takes place here with constant current. This means that the delay time can be made considerably longer and that the derivative of the capacitor voltage is great even at the end of the charging process, thus giving, accurate operation of the relay.

Brief description of the drawings

In the accompanying drawings a circuit diagram of the relay is shown in FIG. 1, while FIGS. 2, 3 and 4 show various types of reference elements according to the drawings.

Description of the preferred embodiments

The connection according to the drawing can be divided into a time circuit to the left of the dotted line A—A and a level-sensing circuit to the right of this line.

The time circuit consists mainly of the RC-circuit and a voltage divider. The RC-circuit consists of the resistor R and capacitor C. The voltage divider is formed by a second control device T2 in parallel with a resistor R2, a reference element Z, a rectifier V1 and a resistor R1. The RC-circuit is connected in parallel with the three last-mentioned elements between the points 1 and 2. Further, a first control device T1 is inserted between the RC-circuit and the voltage divider. This first control device consists of an npn-transistor, the base electrode of which is connected to a point 3 between R and C. The emitter is connected to a point 4 between the rectifier V1 and R1, while the collector is connected to the base electrode of the second control device T2. The second control device also consists of a transistor, the emitter being connected to the positive pole of a feed voltage source U, while the collector is connected to the point 1. The other end of the voltage divider is connected to the negative pole of the voltage source. The rectifier V1 has the same forward voltage drop as the base-emitter voltage drop in the transistor T1, which means that the voltage Ur across the reference element Z is equal to the voltage across the resistor R in the RC-circuit.

The charging voltage for the RC-circuit is thus equal to the voltage between the points 1 and 2, while the capacitor voltage is equal to the voltage across the rectifier V1 and the resistor R1. The difference between the charging voltage and the capacitor voltage is thus equal to the voltage Ur across the reference element and by varying the size and/or type of this element, the charging time of the capacitor can be varied.

The resistance of the resistor R2 is great compared with the other elements in the voltage divider, with the result that, when the time circuit is connected to the voltage U, the greatest part of the voltage will be across R2 and T2. If U is 12 volts, the charging voltage at the start of the charging process will be about 1 volt. The capacitor has no charge and T1 and T2 are not conducting. As the capacitor voltage increases a base current moves to T1 and an amplified current turns on T2, which by shunting R2 provides a higher charging voltage. The capacitor voltage can then increase further and the process continues until T2 is completely turned on and U exceeds the RC-circuit as a charging voltage. The circuit adjusts itself automatically since the emitter of T1 senses the level of the voltage divider and the base senses the voltage level of the capacitor. The output signal of the time circuit is suitably taken out across the transistor T2, the voltage of which drops during the process from almost full value to zero.

The level-sensing circuit can be carried out in many ways and the connection shown is only an example of a possible embodiment. The circuit includes a transistor T3, the base electrode of the transistor being connected to one end of the resistor R2 through a resistor R3.

The emitter of the transistor is connected to the other end of resistor R2 and thereby also to one pole of the voltage source U. The collector of the transistor T3 is connected to the other pole of the voltage source U. A series connection of a rectifier V2, the emitter-collector circuit of a transistor T4, and a relay coil L is connected to the voltage source U. The base of the transistor T4 is connected to the collector of the transistor T3.

At the start of the charging process, the greatest part of the voltage U lies across the resistor R2. Consequently transistor T3 is in its "on" condition, and thus transistor T4 is "off." As the voltage of the capacitor C increases, the voltage across the resistor R2 decreases and the transistor T3 tends more and more to its "off" condition and transistor T4 tends more and more to "on." As the capacitor C begins to be fully charged, the base-emitter voltage drop of the transistor T2 increases and the transistor turns to its "on" condition. Thereby resistor T3 is turned off and T4 completely turned on, so that the relay coil L receives operating current.

The reference element Z may be a resistor or a diode. If temperature compensation is wanted a thermistor may be used. When the reference element is a resistor, the charging current for the capacitor grows slowly and this is favorable in certain cases when a distinct tripping of the relay is wanted. This is shown in FIG. 2. If the reference element is a diode, for example a Zener diode, as shown in FIG. 3, the capacitor will be charged with a constant current.

Sometimes the temperature around the relay will vary widely and then it may be necessary to compensate for this. In such cases a thermistor T is connected in parallel with the resistor. The influence of the thermistor may be compensated by the aid of a resistor R5 in series connection with the thermistor.

I claim:
1. A time relay, comprising an RC-circuit including a capacitor C and a resistance R in series, the delay of said circuit being determined by the charging time of said capacitor, said relay comprising a time circuit and a level sensing circuit, said time circuit comprising said RC-circuit and a voltage divider, said voltage divider comprising a first resistor R1, a first rectifier V1, a reference element Z and a second resistor R2, said RC-circuit being parallel connected with that part of the voltage divider which comprises the first resistor, the first rectifier and the reference element, the connection point 3 between the resistor and the capacitor of the RC-circuit being joined to a point 4 between the first resistor and the first rectifier in the voltage divider by the base-emitter circuit of a first transistor T1, said level sensing circuit including a second transistor T3 and a third transistor T4, the base of said second transistor being connected to the voltage divider between said reference element and said second resistor, the base of said third transistor being connected to the collector of said second transistor, the emitter-collector circuit of said third transistor including the coil of a tripping relay.

2. A time relay according to claim 1, the collector of said first transistor being connected to the base of a fourth transistor T2, the emitter-collector circuit of which is parallel connected to said second resistor of said voltage divider.

3. A time relay according to claim 1, in which the reference element is a resistor.

4. A time relay according to claim 1, in which the reference element is a diode.

5. A time relay according to claim 1, in which the reference element is combined with a thermistor.

References Cited

UNITED STATES PATENTS

| | | | |
|---|---|---|---|
| 2,906,926 | 9/1959 | Bauer | 317—148.5 |
| 2,927,259 | 3/1960 | Neal | 317—148.5 X |
| 3,046,470 | 7/1962 | Blocher | 317—148.5 X |
| 3,158,790 | 11/1964 | Garratt | 317—142 |
| 3,207,926 | 9/1965 | Schmader | 317—148.5 X |
| 3,286,135 | 11/1966 | Haver et al. | 317—142 |

JOHN F. COUCH, *Primary Examiner.*

A. D. PELLINEN, *Assistant Examiner.*

U.S. Cl. X.R.

307—293; 317—148.5